US009742771B2

(12) United States Patent
Smith et al.

(10) Patent No.: US 9,742,771 B2
(45) Date of Patent: *Aug. 22, 2017

(54) SYSTEM AND METHOD FOR USING A SEPARATE DEVICE TO FACILITATE AUTHENTICATION

(71) Applicant: ANGEL SECURE NETWORKS, INC., Old Town, ME (US)

(72) Inventors: Fred Hewitt Smith, Old Town, ME (US); Cynthia Smith, Old Town, ME (US)

(73) Assignee: Angel Secure Networks, Inc., Old Town, ME (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,688

(22) Filed: Jan. 25, 2016

(65) Prior Publication Data

US 2016/0142416 A1    May 19, 2016

Related U.S. Application Data

(63) Continuation of application No. 14/089,737, filed on Nov. 25, 2013, now Pat. No. 9,270,660.

(Continued)

(51) Int. Cl.
*G06F 15/16* (2006.01)
*G06F 21/00* (2013.01)
(Continued)

(52) U.S. Cl.
CPC .............. *H04L 63/10* (2013.01); *H04L 63/08* (2013.01); *H04L 63/0853* (2013.01);
(Continued)

(58) Field of Classification Search
CPC .......... G06F 15/16; G06F 21/00; G06F 21/10; G06F 21/31; G06F 21/32; G06F 21/34;
(Continued)

(56) References Cited

U.S. PATENT DOCUMENTS 4,408,203 A    10/1983  Campbell
4,658,093 A     4/1987  Hellman
(Continued)

FOREIGN PATENT DOCUMENTS

EP    0703531    3/1996
EP    0778512    6/1997

OTHER PUBLICATIONS

US 5,748,741, 05/1998, Johnson et al. (withdrawn)
(Continued)

*Primary Examiner* — Joseph P Hirl
*Assistant Examiner* — Kalish Bell
(74) *Attorney, Agent, or Firm* — Guntin & Gust, PLC; Ralph Trementozzi

(57) ABSTRACT

A system that incorporates the subject disclosure may perform, for example, operations including receiving a request from a first device to access information content of a second device. The process further includes forwarding a token to the second device by way of a second wireless network, to obtain a second device token, and forwarding the token to the first device by way of the first network to obtain a first device token, wherein the first device forwards the first device token to the second device by way of a third network. A confirmation that the token was received at the first device is based on the result of the comparison indicating a match between the first device token and the second device token. Access to the information content of the second device is authorized in response to the confirmation. Other embodiments are disclosed.

20 Claims, 7 Drawing Sheets

Related U.S. Application Data

(60) Provisional application No. 61/729,598, filed on Nov. 25, 2012.

(51) Int. Cl.

| | | |
|---|---|---|
| *G06F 21/10* | (2013.01) | |
| *G06F 21/31* | (2013.01) | |
| *G06F 21/32* | (2013.01) | |
| *G06F 21/34* | (2013.01) | |
| *G06F 21/35* | (2013.01) | |
| *G06F 21/43* | (2013.01) | |
| *G06F 21/62* | (2013.01) | |
| *H04L 29/06* | (2006.01) | |
| *H04L 29/08* | (2006.01) | |
| *H04W 4/00* | (2009.01) | |
| *H04W 12/08* | (2009.01) | |
| *H04W 12/04* | (2009.01) | |
| *H04W 84/04* | (2009.01) | |
| *H04W 84/12* | (2009.01) | |

(52) U.S. Cl.
CPC ............. *H04L 63/18* (2013.01); *H04L 67/10* (2013.01); *H04W 4/008* (2013.01); *H04W 12/08* (2013.01); *H04L 63/0807* (2013.01); *H04L 63/107* (2013.01); *H04W 12/04* (2013.01); *H04W 84/042* (2013.01); *H04W 84/12* (2013.01)

(58) Field of Classification Search
CPC .......... G06F 21/35; G06F 21/43; G06F 21/62; H04L 63/10; H04L 63/18; H04L 67/00; H04L 67/104
USPC .... 709/217, 225, 229, 232; 726/2–4, 16, 17, 726/21, 26–29
See application file for complete search history.

(56) References Cited

U.S. PATENT DOCUMENTS

| | | |
|---|---|---|
| 4,696,003 A | 9/1987 | Kerr et al. |
| 4,731,880 A | 3/1988 | Ault et al. |
| 4,962,498 A | 10/1990 | May |
| 4,999,806 A | 3/1991 | Chernow et al. |
| 5,001,755 A | 3/1991 | Skret |
| 5,005,122 A | 4/1991 | Griffin et al. |
| 5,023,907 A | 6/1991 | Johnson et al. |
| 5,155,847 A | 10/1992 | Kirouac et al. |
| 5,247,683 A | 9/1993 | Holmes et al. |
| 5,301,247 A | 4/1994 | Rasmussen et al. |
| 5,317,744 A | 5/1994 | Harwell et al. |
| 5,388,211 A | 2/1995 | Hornbuckle |
| 5,416,842 A | 5/1995 | Aziz |
| 5,421,009 A | 5/1995 | Platt |
| 5,438,508 A | 8/1995 | Wyman |
| 5,452,415 A | 9/1995 | Hotka |
| 5,495,610 A | 2/1996 | Shing et al. |
| 5,509,070 A | 4/1996 | Schull |
| 5,509,074 A | 4/1996 | Choudhury et al. |
| 5,548,649 A | 8/1996 | Jacobson |
| 5,594,866 A | 1/1997 | Nugent |
| 5,638,512 A | 6/1997 | Osman et al. |
| 5,671,279 A | 9/1997 | Elgamal |
| 5,706,507 A | 1/1998 | Schloss |
| 5,708,709 A | 1/1998 | Rose |
| 5,708,780 A | 1/1998 | Levergood et al. |
| 5,710,883 A | 1/1998 | Hong et al. |
| 5,732,275 A | 3/1998 | Kullick et al. |
| 5,737,706 A | 4/1998 | Seazholtz et al. |
| 5,748,896 A | 5/1998 | Daly et al. |
| 5,826,014 A | 10/1998 | Coley et al. |
| 5,864,747 A | 1/1999 | Clark et al. |
| 5,909,589 A | 6/1999 | Parker et al. |
| 5,974,250 A | 10/1999 | Angelo et al. |
| 6,067,582 A | 5/2000 | Smith |
| 6,324,647 B1 | 11/2001 | Bowman-Amuah |
| 6,532,543 B1 | 3/2003 | Smith |
| 6,668,325 B1 | 12/2003 | Collberg et al. |
| 6,842,862 B2 | 1/2005 | Chow et al. |
| 6,918,038 B1 | 7/2005 | Smith |
| 7,117,535 B1 | 10/2006 | Wecker |
| 7,124,445 B2 | 10/2006 | Cronce et al. |
| 7,149,308 B1 | 12/2006 | Fruehauf et al. |
| 7,170,999 B1 | 1/2007 | Kessler et al. |
| 7,233,948 B1 | 6/2007 | Shamoon et al. |
| 7,328,453 B2 | 2/2008 | Merkle et al. |
| 7,370,360 B2 | 5/2008 | Van der Made |
| 7,685,937 B2 | 3/2010 | Karioja et al. |
| 7,913,305 B2 | 3/2011 | Bodorin et al. |
| 7,991,388 B1 | 8/2011 | Becker et al. |
| 9,270,660 B2 * | 2/2016 | Smith ..................... H04L 63/08 |
| 2003/0126457 A1 | 7/2003 | Kohiyama et al. |
| 2003/0188187 A1 | 10/2003 | Uchida |
| 2003/0212902 A1 | 11/2003 | Van der Made |
| 2003/0221121 A1 | 11/2003 | Chow et al. |
| 2003/0236986 A1 | 12/2003 | Cronce et al. |
| 2004/0111613 A1 | 6/2004 | Shen-Orr et al. |
| 2005/0097441 A1 | 5/2005 | Herbach et al. |
| 2006/0005250 A1 | 1/2006 | Chu |
| 2006/0005252 A1 | 1/2006 | Chu et al. |
| 2006/0095790 A1 | 5/2006 | Nguyen et al. |
| 2007/0234070 A1 | 10/2007 | Horning et al. |
| 2007/0252001 A1 | 11/2007 | Kail et al. |
| 2009/0237203 A1 | 9/2009 | Determan et al. |
| 2011/0001606 A1 | 1/2011 | Charych |
| 2012/0094598 A1 | 4/2012 | Tysowski |
| 2012/0331536 A1 * | 12/2012 | Chabbewal ............ G06F 21/33 726/7 |
| 2013/0081119 A1 * | 3/2013 | Sampas ................ G06Q 20/206 726/7 |
| 2013/0254521 A1 | 9/2013 | Bealkowski et al. |
| 2014/0043141 A1 | 2/2014 | Cazanas et al. |

OTHER PUBLICATIONS

"Set Tool Kit for Secure Commerce", Bank Systems +Technology, p. 16, May 1996.
"Software Taps Net for Supply Data Sharing", Electronic Buyers News, Section: Purchasing, p. 50, Apr. 22, 1996.
Arnow, "DP: A Library for Building Portable, Reliable Distributed Applications", USENIX Tech Conf, pp. 235-247, Jan. 16-20, 1995.
Baentsch et al., "WebMake: Integrating Distributed Software Development in a Structure-enhanced Web", Computer Networks and ISDN Systems 27, pp. 789-800, 1995.
Bernstein, "Let's Talk: Interapplication Communications in C++ Using X Properties", The X Journal, pp. 37-44, Jan. 2, 1996.
Bryant, "Am I Bid Six? Click to Bid Six!", The New York Times, Section D1, May 13, 1996.
Chii-Ren Tsai et al., Distributed Audit with Secure Remote Procedure Calls, pp. 154-160, XP000300426, Oct. 1991.
Chris Jones, "Licensing Plan Flows from Stream", Infoworld, Section: News, May 6, 1996.
D. Trommer, "ECS Catalog Merges EDI/Net Platforms, Electronic Buyers News", Section: Purchasing, p. 54, May 20, 1996.
Dagenais et al., "LUDE: A Distributed Software Library", USENIX Tech Conf, pp. 25-32, Nov. 1-5, 1993.
DellaFera et al, "The Zephyr Notification Service", USENIX Winter Conference, Feb. 9-12, 1988.
Diane Trommer, "GE/Netscape Form Software Venture", Electronic Buyers News, Section: Online @EBN, p. 54, Apr. 22, 1996.
Eirich, "Beam: A Tool for Flexible Software Update", USENIX Tech Conf, pp. 75-82, Sep. 19-23, 1994.
Ellen Messmer, "Active X Pioneer Pushes Commerce", Network World, p. 33, May 6, 1996.
Flohr "Electric Money", BYTE, pp. 74-84, 1996.
Lodin, "The Corporate Software Bank", USENIX Tech Conf, pp. 33-42, Nov. 1-5, 1993.

(56) References Cited

OTHER PUBLICATIONS

M. Takahata et al., Real-Time Video-On-Demand System based on Distributed Servers and an Agent-Oriented Application, vol. 2663, 31 pp. 242-251, Jan. 1996.
Maeda et al., "Service without Servers", IEEE, 4m IEEE Workshop on Workstation Operating Systems, pp. 170-176, Aug. 1, 1993.
Marshall, "Banking on the Internet", Communications Week, p. 1, May 20, 1996.
Messmer, "Edify Software to Let Banks Open Doors Online", Network World, p. 16, May 20, 1996.
Messmer, "Start-up puts security SOCKS on Windows apps", NE, 39, May 20, 1996.
Michael B. Jones, "Interposition Agents: Transparently Interposing User Code at the System Interface", 14th ACM Symposium on Operating Systems Principals, pp. 80-93, 1993.
Nachbar, "When Network File Systems Aren't Enough: Automatic Software Distribution Revisited", USENIX Tech. Conf., pp. 159-171, Summer 1986.
Nash et al., "Vendors Deliver IS-specific apps over the 'net", Computer World, Section: News, p. 16, May 6, 1996.
Noble et al., "A Programming Interface for Application-Aware Adaptation in Mobile Computing", USENIX Association, vol. 8, No. 4, pp. 345-363, Fall 1995.
One Click Software Via the Web, DATAMATION, p. 16, May 1, 1995.
Ozer, Online Software Stores, PC Magazine, Section: Trends, p. 36, May 28, 1996.
Rodriguez, "Pushing the Envelope", Communications Week, Section: Internet/ Internet, p. 37, May 31, 1996.
Rupley, "Digital Bucks? Stop Here", PC Magazine, Section: First Looks, p. 54, May 28, 1996.
Semilof, "Boosting Web Business", Communications Week, Section: News Brief, p. 31, May 20, 1996.
Silwa, "Netscape Unveils New 'New Commerce Offerings", Networld World, Section: Internet News, p. 10, May 13, 1996.
Stream International Inc., Stream, LitleNet, BBN, and KPMG Announce Industry-Wide Initiative to Enable Wide-Scale Software Electronic Commerce, http://www.stream.com, May 12, 1996.
Tim Clark, "The Big Sell, Software Online", INTER@CTIVE Week, pp. 31-35, Apr. 22, 1996.
Turoff et al, "An Electronic Information Marketplace", North Holland Computer Networks and ISDN Systems 9, pp. 79-90, 1985.
Wexler, "AT&T Sells Insurers on the Web", Network World, p. 27, May 20, 1996.
Wong, "Local Disk Depot-Customizing the Software Environment", USENIX Tech Conf, pp. 51-55, Nov. 1-5, 1993.
Yamada et al, "Electronic Distribution Program on tap", Computer Reseller News, pp. 1 and 169, Apr. 29, 1996.
Lian, , "Time Delay Modeling and Sample Time Selection for Networked Control Systems", Proceedings of ASME-DSC, vol. XX, pp. 1-8.
Smalley, et al., "A security Policy Configuration for the Security-Enhanced Linux", Feb. 2001, pp. 1-20.

\* cited by examiner

SYSTEM AND METHOD FOR USING A SEPARATE DEVICE TO FACILITATE AUTHENTICATION

CROSS-REFERENCE TO RELATED APPLICATIONS

This application is a Continuation of and claims priority to U.S. patent application Ser. No. 14/089,737 filed Nov. 25, 2013, which claims priority to U.S. Provisional Application No. 61/729,598, filed on Nov. 25, 2012. The contents of each of the foregoing is/are hereby incorporated by reference into this application as if set forth herein in full.

RELATED APPLICATIONS

The present disclosure is related to U.S. Provisional Patent Application No. 61/671,673, entitled "Secure Control Logic for Computing Environments," filed Jul. 13, 2012; U.S. Provisional Patent Application No. 61/671,676, entitled "Audit of Remote Computing Environments," filed Jul. 13, 2012; U.S. Provisional Patent Application No. 61/701,714 filed Sep. 16, 2012 entitled "System and Method for Obtaining Keys to Access Protected Information"; U.S. patent application Ser. No. 13/410,287 Entitled "Controlling User Access to Electronic Resources Without Password," filed Mar. 1, 2012, which claims the benefit of U.S. Provisional Patent Application No. 61/447,774, entitled "No Password Orthogonal Authentication Of Humans (NOAH)," filed on Mar. 1, 2011; and U.S. patent application Ser. No. 13/942,319, entitled "System and Method for Policy Driven Protection of Remote Computing Environments" filed on Jul. 15, 2013, which claims the benefit of U.S. Provisional Patent Application No. 61/671,675, entitled "Simultaneous Installation of Software on Vehicle and Control Station" filed on Jul. 13, 2012. All sections of each of the aforementioned applications are incorporated herein by reference in its entirety.

FIELD OF THE DISCLOSURE

The subject disclosure relates to System and method for using a separate device to facilitate authentication.

BACKGROUND

Current technology for remote logins requires that a user provide some form of identification (ID) and a password. An ID and password can be stolen or otherwise compromised by sophisticated adversaries utilizing techniques such password sniffing, secretly photographing a login session, using various methods of social engineering to obtain the ID and the password. Currently technology is also vulnerable to rogue employees who voluntarily provide a password and ID to adversaries. Currently technology also may develop a password from a login password or passphrase, which is then used to encrypt data provided by the user. To the extent that such a password or encryption key is stored on a device, it would be subject to discovery by an adversary if the device were stolen.

With respect to the user experience, under current technology the ID and the password have important security implications and must be protected from capture by an adversary. The passwords are typically long and complicated. A challenge is that a user has difficulty remembering the IDs and passwords, and typically maintains lists of these IDs and passwords elsewhere, such as in a "secret" notebook, which the user employs when a login is required. Users often have multiple sets of IDs and passwords that are required for different logins. The IDs and passwords are changed periodically by the site administrator, further compounding the difficulty for the user in maintaining complex IDs and passwords, even when maintained in a secret notebook. As the number of required IDs and passwords grows, the task of maintaining the secret notebook becomes more difficult for the user. Furthermore, the user must suffer the inconvenience of period lockout from his or her account and the risk that an adversary will discover the secret ID and password and steal valuable information.

BRIEF DESCRIPTION OF THE DRAWINGS

Reference will now be made to the accompanying drawings, which are not necessarily drawn to scale.

DETAILED DESCRIPTION

Figure 1:
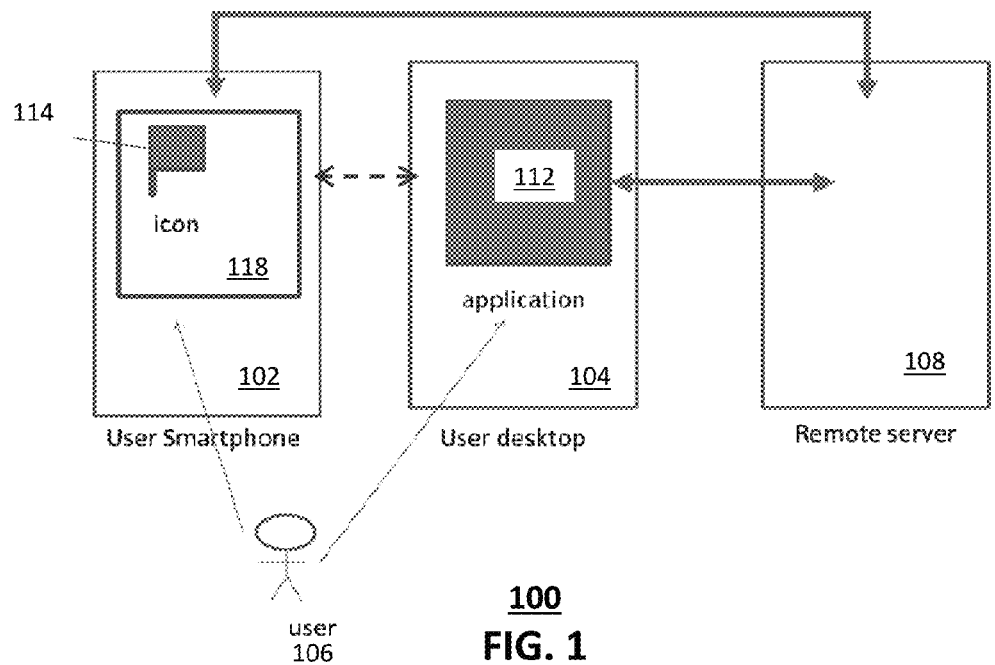
FIG. 1 depicts a block diagram of an embodiment of a system to facilitate user authentication.

A server can use an encryption key to decrypt authentication information thereby facilitating communication with network-accessible applications that may be remotely located from the server. Servers can also use encryption keys to decrypt files containing sensitive data.

Encryption keys required by the server to obtain such authentication information and/or to access such files containing sensitive data can be stored in files on an encrypted file system. A chain of software agents, e.g., a chain software agent network, includes several software agents collaborating to conduct a common function. For example, a chain of software agents, such as the software agents (ANGELs) described in the references below, can provide an encryption key to decrypt an encrypted file system.

For example, when the server requires access to a particular encrypted file system, a chain of software agents is invoked to collectively provide the key allowing decryption of the file system so that the file system can be accessed. When the file system is no longer needed, the key generated by the software agent chain can be destroyed preventing access to the file system's unencrypted data.

In accordance with previously described capabilities of a chain of software agents, the agents can conduct covert examinations of a requesting system to determine if the request is actually from the server and whether the system is in a "safe state." If the request is fraudulent, or if the system is not in a safe state, the request to decrypt the file system does not produce a proper key, and the file system remains encrypted.

One embodiment of the subject disclosure includes a process including receiving, by a system comprising a processor, a request from a first device to access information content of a second device. The process further includes determining, by the system, that the first device is authorized to access the information content according to authorization credentials, and determining, by the system, a token associated with the request in response to determining that the first device is authorized to access the information content. The token is forwarded, by the system, to the first device, and it is confirmed, by the system, that the token was received at the first device. Access to the information content of the second device is authorized, by the system, in response to confirming that the token was received at the first device.

Another embodiment of the subject disclosure includes a system including a processor and a memory that stores executable instructions that when executed by the processor, facilitate performance of operations including receiving a request from a first device to access information content of a second device, and determining that the first device is authorized to access the information content according to authorization credentials. A token associated with the request is determined in response to determining that the first device is authorized to access the information content. The toke is forwarded to the first device and it is confirmed that the token was received at the first device. Access is authorized to the information content of the second device in response to confirming that the token was received at the first device.

Yet another embodiment of the subject disclosure includes a machine-readable storage medium, that includes executable instructions that, when executed by a processor, facilitate performance of operations, including receiving a request from a first device to access information content of a second device. The operations include determining that the first device is authorized to access the information content according to authorization credentials, and determining a token associated with the request in response to determining that the first device is authorized to access the information content. The token is forwarded to the first device, and it is confirmed that the token was received at the first device. Access to the information content of the second device is authorized in response to confirming that the token was received at the first device.

FIG. 1 depicts a block diagram of a system 100 including a first device 102 in communication with one a second device 104, a third device 108, or a combination of the second and third devices 104, 108. In the illustrative example, the second device 104 can include a processing device, such as a personal computer, e.g., a desktop, or a laptop computer, a robot, an unpiloted aircraft (drone), a vehicle, and the like, hosting an application program 112. The first device 102 can include equipment of a user 106, such as a mobile communication device, e.g., a smartphone, a tablet device, an e-reader, a personal data assistant, or mobile communication device or the like. The second device can be operated by way of a remote controller. In at least some instances, the second device is untethered, e.g., from the remote controller.

In the illustrative examples, user access to one of the application program 112, the second device 104, or both the application program and the second device 112, 104 is restricted. In at least some embodiments, the user 106 who wishes to run or otherwise access the application program 112, also requires access to data the third device 108. For example, the third device 108 can be a remote server that participates in a process for granting the user 106 access to the application program 112. The remote server 108 can include a process that authenticates the user 106, and/or equipment of the user, such as, e.g., the mobile device 102. The authentication process can include determining whether the user 106, and/or equipment of the user, 102 is entitled to access data located on the remote server.

In an illustrative example, the user 106 has a mobile communications device, such as a smartphone 102. The smartphone 102 presents on a display an icon 114 sign. The smartphone accepts a user selection of the icon 114, for example, by a user touch of the icon 114 on a touch-sensitive display 118 of the smart phone 102. Selection of the icon 114 causes an application program to run on the smartphone. The application program associated with the icon 114, communicates with one of the second device 104, the remote server 108, or a combination of both devices 104, 108.

The smartphone application associated with the icon 114, sends identifying information, such as an identification number associated with the smart phone 102, and/or user credentials, such as, e.g., a user identification or phone number, to the server. In at least some embodiments, such communications between devices 102, 104, 108 can be accomplished in whole or in part over an encrypted communications channel. The remote server 108 checks the credentials to determine whether the user and/or the user device 102 can be authorized to access the application program 112. If the credentials are sufficient, or otherwise in order, the smartphone 102 receives a token, such as a first number. For example, the first number can be a relatively short number that can be determined, for example, as a four or five digit random number. The smartphone 102 displays the token. In response to viewing the token, the user is prompted to enter the token into a data entry portion of the smartphone 102. The data entry portion can include one or more of a keypad, a button, a voice command, and the like. The smartphone 102 forwards the user-entered token to one or more of the second device 104 or the remote server 108. The second device 104 and/or remote server 108 compares the user entered token received from the smartphone 102 with the first, token sent to the smartphone. If the numbers match, the second device 104 and/or the remote server 108 permit access to the application program by way of the second device 104. Such access can include a user login at the second device 104. In the illustrative example, the remote server 108 can include an application that has been configured to correspond with the smartphone 102.

An example of a secure situation described in relation to FIG. 1, is where the remote server 108 has been configured to communicate directly with the user's smartphone 102. In this instance, the application associated with the icon 114 on smartphone communicates the user's credentials directly to the remote server 108. The remote server 108 can include a centralized authentication server 108, e.g., providing authorization services for one or more users 106 to one or more application programs 112 on one or more second devices 104. In some embodiments, the credentials can include without limitation a traditional identification, e.g., a user and/or device ID and/or password, or other credentials that are recognizable by the server. The ID and password can be protected by processes outlined in U.S. Provisional Patent Application No. 61/701,714, entitled "System and Method for Obtaining Keys to Access Protected Information."

In some embodiments, the token can be accompanied by supplemental information to establish authorization subject to greater degrees of complexity than relying on the token alone. For example, one of the first device 102, the second device 104, or a combination of the first and second devices 102, 104 can provide supplemental information, such as biometric information obtained from the user 106. Biometric information can include one or more of a fingerprint, a voice print, a weight, a conductivity, a thermal signature, a retina scan, or an image, such as a photograph and/or video of the user 106. As part of the credentials, the smartphone 102 can acquire a picture of the user 106, which can be framed, for example, within an area defined by the authentication application running on the smartphone. Image data, such as a picture obtained, e.g., at the time a request for access is made from the first device 102, can be compared with image data, e.g., another picture. For example, the other picture can be a previously submitted picture. Such software can include image processing algorithms adapted for comparing images to determine whether the images are identical or at least approximately the same.

If the pictures do not match, the login is not granted. Access, e.g., to the application program 112, can be denied for a period of time, as in a lock-out period of time. The period of time can be a fixed, predetermined time or a varying time, e.g., increasing after subsequent failures in a match of the pictures. A small number of repeats can be allowed, e.g., to account for problems encountered in initially obtaining a picture. Namely, the user 106 may not be lined up properly when the picture is taken, the lighting might not be conducive to an intelligible picture, and so forth. In at least some embodiments, a failure to match one of the token, the biometric information, e.g., the picture, or any other supplemental information can effectively lock the credentials such that any further attempts to access the application program 112, even if they include valid information can be blocked or otherwise locked out. A smartphone 102 can also be configured to require another form of identification, such as a fingerprint, that can be compared against a previously sample of an authorized fingerprint. If a finger print of a user of the smartphone does not match the sample or copy of the authorized fingerprint, login is not granted.

Other examples of supplemental information, without limitation, can include environmental information, e.g., obtained from an environment including the user 106 and/or the first device 102. Examples of environmental information can include a time and/or a location, such as an address and/or geolocation coordinates, such as obtained, e.g., from a global positioning system (GPS) receiver. Other examples of environmental information can include proximity of one or more of the user 106 or the smartphone 102 to a spatial reference. Examples of spatial reference include proximity to a device, such as proximity of the smartphone 102 to the second device 104. Such proximity can be determined, e.g., by comparison of geolocation coordinates. In at least some embodiments, proximity can be determined according to one or more of a network or a communication protocol. In some embodiments, a wireless communication link between the smartphone 102 and the second device 104, e.g., according to one or more of WiFi, BlueTooth or near field communication (NFC) protocol. Proximity requirements related to authentication can be controlled, at least to some degree, according to a choice of network protocol, e.g., NFC requiring proximity on the order of inches, versus BlueTooth or WiFi demonstrating proximity to greater distances. Still further examples of environmental information can include lighting, temperature, humidity, noise, e.g., background noise, and the like.

Still further examples of supplemental information can include authentication of another first device 102. For example, a login procedure can also be configured so that approval of a third party is required to permit the login. If third-party approval, for example, by another person, is not granted, the login will not be permitted. A first smartphone 102 can belong to an employee 106. The employee desires access to the application program 112. The employee 106 can use any one or more of the authentication techniques disclosed herein, including exchange of a token, or short number or phrase, as a partial authentication. A separate authentication from another individual and/or equipment of the other individual can also be required. In the illustrative example, authorization according to a second mobile device, e.g., smartphone 102, of the employee's supervisor is also necessary.

If the credentials are sufficient, or otherwise in good order, the remote server 108 can generate a token, such as a short phrase or random number or sequence of numbers, letters and/or symbols, which are transmitted to the smartphone 102 and displayed on the smartphone display 118. The user 106 responds to the token, for example entering a number in the application he/she is using corresponding to the displayed short random number, to login to the remote server 108. The server 108 compares the user-entered number received from the login and the reference number sent to the smartphone 102. If the numbers are identical, the remote server allows the login. To the extent any supplemental information is used in the authentication process, the supplemental information and/or results of comparison of the supplemental information is provided to the server 108. The server determines authentication according to results of the token comparison alone or in combination with the results of comparisons of supplemental information.

In some embodiments, the token can be sent to the first device, e.g., a smartphone 102, transferred to one or more of the second device 104, the remote server 108, or a combination of both. For example, a token can be provided by the remote server 108 to the smartphone 102 by way of a first communication link. Examples of a first communication link can include WiFi and/or mobile cellular radio communications. The smartphone 102, now having received the token, can exchange or otherwise transfer the token to the second device 104, by way of a second communication link. In at least some embodiments, the second communication link is different than the first. Some examples of the second communications link can include BlueTooth or NFC. Thus, the token can be exchanged without a user having to enter any information manually. A successful exchange of the token can result in authorization being granted, e.g., by the remote server 108, to the application program 112 on the second device 104.

Figure 2:
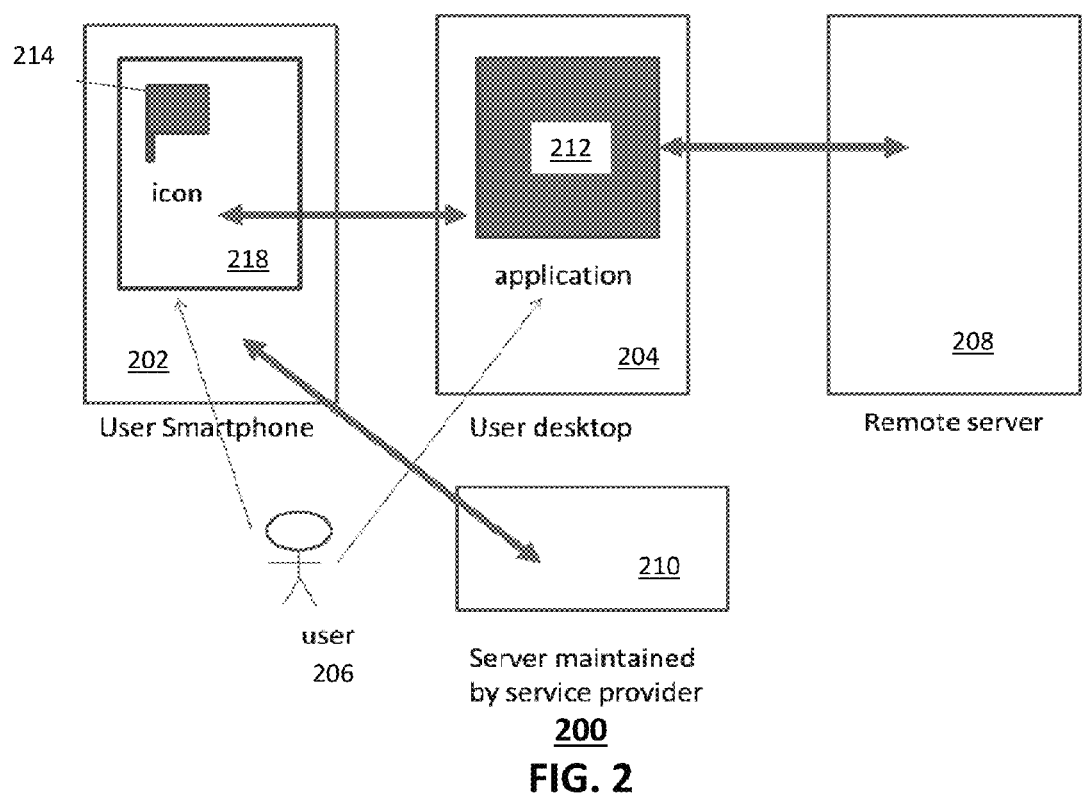
FIG. 2 depicts a block diagram of an embodiment of a system to facilitate user authentication in which the server expects a conventional authentication by way of user identification and password.

FIG. 2 depicts a block diagram of another embodiment of a system 200 to facilitate user authentication in which a server expects a conventional authentication by way of user identification and password. The system 200 includes a first device, such as a mobile device, e.g., a smartphone 202 in communication with a second device, such as an application server or desktop computer 204. The desktop computer 204 hosts an application program 212, with which a remote server 208 has not been configured to communicate with a mobile communications device, such as a smartphone 202, and wherein the remote server 208 expects a conventional ID and password. In this example, the user 206 selects a displayed icon, for example, by touching a Flag icon 214. Now however, the Flag icon 214 communicates over a secure channel with another server 210. The other server 210 can be maintained by a third party, e.g., by a mobile communications a service provider. The service provider server 210 communicates with the application 212 over a secure channel and provides the appropriate credentials, e.g., a login ID and/or password. The application 212 then uses the credentials, e.g., the user ID and password to log into the remote server 208. In some embodiments, the second device 204 can include a vehicle, such as an unpiloted aircraft (drone), a remotely piloted vehicle or drone, e.g., controlled by the first device or by some other remote control device. In some embodiments, the vehicle can include a ground vehicle, such as an automobile.

In the example described in relation to FIG. 1, the remote server 108 is configured to respond directly with the smartphone 102. In the FIG. 2 example, the smartphone 202 corresponds with another server 210, for example, maintained either by the service provider or by another entity, even including the user 206 himself/herself.

The same or similar credentials as disclosed hereinabove in reference to FIG. 1 can be submitted to the service provider server and verified according to any suitable technique, including the techniques disclosed herein.

In the case described by FIG. 2, in which the remote server 208 has not been configured to correspond with the smartphone 202, the service provider server 210 corresponds with the authentication application that the user 206 employs to log into the application server 204, and the service provide server 210 covertly supplies the correct credentials to the application server 204. These credentials can be difficult to detect, or "sniff" and would not be visible to an adversary watching the screen.

In at least some embodiments, the credentials of the user 106, 206 only need to be provided one time to the remote server 108 (FIG. 1) or the service provider server 210 (FIG. 2) rather than for every login.

In some embodiments, the authentication application and/or the application program 112, 212 can be provided with an encryption key that the authentication application can use to encrypt data that it reads or generates.

Alternatively or in addition, it is possible to provide one of the authentication application, the application program, or both, with key encryption data it writes that does not depend on the credentials in presents to the remote server. In the case shown by FIG. 1, for example, the encryption key can be generated by the remote server 108, 210, passed to the application 112, 212, used by the application to encrypt data, and be deleted by the application when no longer needed. This key is maintained by the remote server and is unknown the user. Thus the user cannot allow unauthorized access to data encrypted by the key.

In the case of the system 200 of FIG. 2, the service provider server 210 can generate a security, e.g., encryption, key, pass the key to the application 112, 212, the application encrypts data it reads with this key and deletes the key when the application is no longer in use. This will then allow the application to encrypt data that the user cannot thereafter decrypt. Again the user will not be able to allow unauthorized access to data encrypted by the application. The illustrative examples disclosed herein relate to the use of agent technology to provide keys for servers, where the keys are not stored in the clear on the machine on which the server is located.

Figure 3:
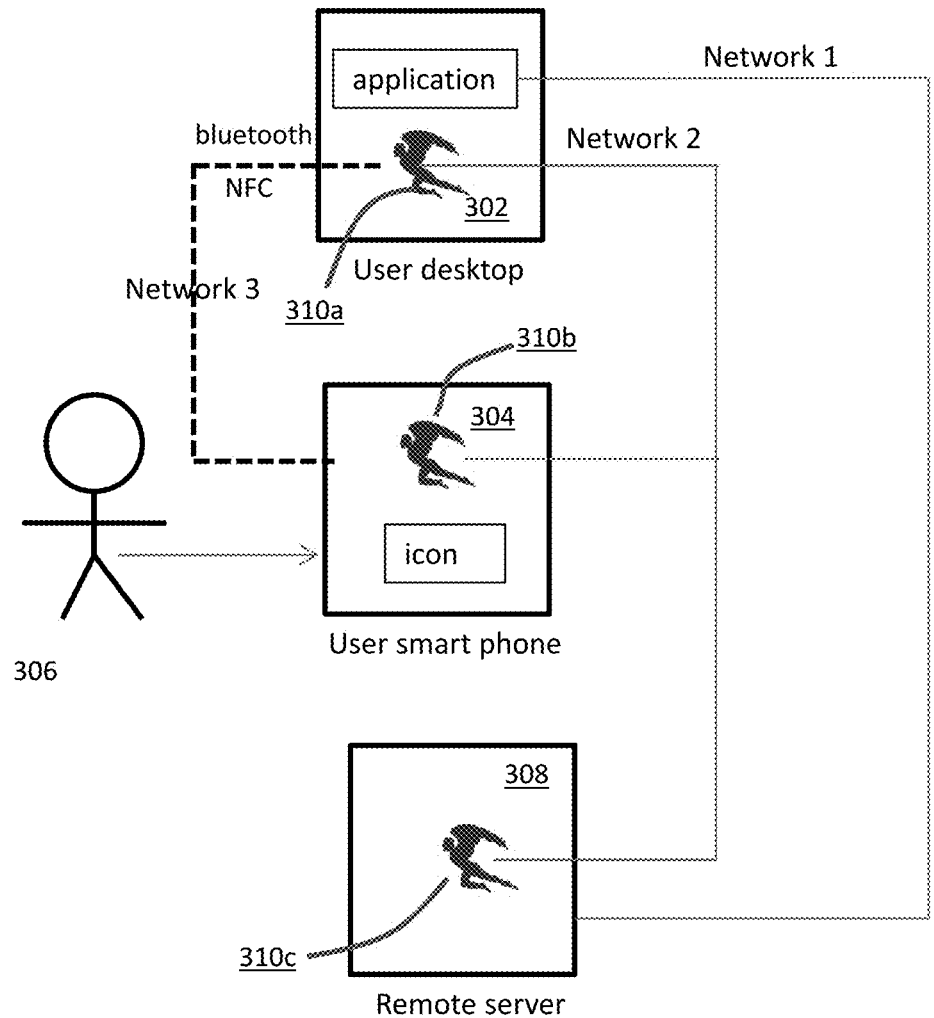
FIG. 3 depicts a block diagram of an embodiment of a system to facilitate user authentication incorporating anonymous networked electronic link agents.

FIG. 3 illustrates a system 300 using agent technology. The agent technology, as described in U.S. patent application Ser. No. 13/942,319, entitled "System and Method for Policy Driven Protection of Remote Computing Environments" and U.S. Provisional Patent Application No. 61/701,714 filed Sep. 16, 2012 entitled "System and Method for Obtaining Keys to Access Protected Information," allow multiple software agents running on different processors to examine different parts of the system and the scenario, and, working as a chain of agents, to produce keys based on the results of these examinations. As described further below, the use of chains can implement complex logic, e.g., in management and/or dissemination of secure information, such as encryption keys.

The system 300 includes a desktop computer 302 hosting an application program, a mobile device 304 having an authentication application associated with an icon, and a remote server 308. Separate software agents 310a, 310b, 310c (generally 310) have been installed on the desktop, 203, the mobile device 304 and the remote server 308 of the system 300. The application and the remote server 308 are in communication through a first network. Agents (shown with an Angel Icon) can be connected through a separate, second network. The agent 310b on the cell phone 304 is also connected to the agent 310a on the user desktop 302 through a third network, e.g., using a short distance protocol such as BlueTooth or NFC, as disclosed above. The agents 310 running on the second and third networks do not necessarily depend on the networks connecting the user desktop 302 and the remote server 308 and thus can act as an overlay rather than having to be embedded in the system 310, connecting the remote server 308 and the desktop 302. In the example system 300, the user 306 can log into the cell phone 304 using the icon as previously discussed. The cell phone 304 communicates with the user desktop 302 and the remote server 308 through the network of agents 310. In some embodiments, the network of agents 310 are configured according to one or more various chains of agents 310 to conduct examinations of the setup. It is understood that any one of the devices 302, 304, 308 can be configured with one or more agents, such that different chains of agents 310 can be established according to the same three devices 302, 304, 308. If part of the network includes a short distance link such as Bluetooth or NFC that would assure that the user was in close proximity to the desktop, which might be an important security feature.

Figure 4:
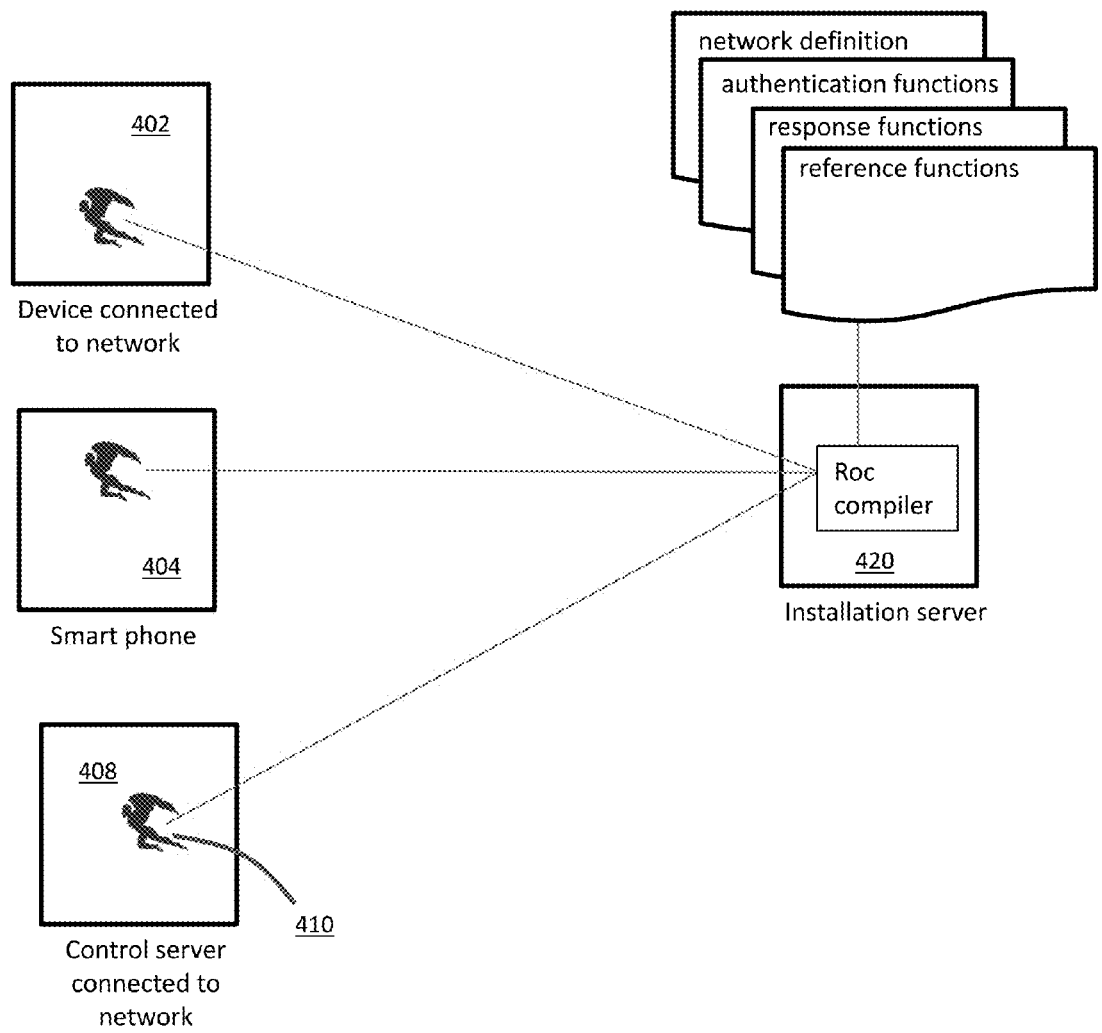
FIG. 4 depicts a block diagram of an embodiment of a system to facilitate user server authentication in which anonymous networked electronic link agents are installed remotely.

FIG. 4 depicts a block diagram of an embodiment of a system 400 to facilitate user server authentication in which agents, e.g., anonymous networked electronic link agents, are installed remotely. The system 400 reflects an installation of the agents 410. In some embodiments, the agents 410 can be installed periodically, e.g., according to a configuration and/or maintenance phase or cycle. Alternatively, agents 410 can be installed from an installation server 420, just-in-time, e.g., on demand. The network of agents can be constructed from one or more of a network definition file, authentication functions, and reference functions. As described in U.S. application Ser. Nos. 13/942,319 and 61/701,714, and further described below. Inputs potentially provide for an arbitrarily large possibility of control and logic functions.

By combining one or more aspects of the systems 300, 400, functionality can be achieved that allows for a remote login under detailed conditions. For example, suppose that a company wanted to allow an employee to log into the remote server from a specific location and a specific time, such as, for example, when the employee was visiting another site.

Control logic that would implement these restriction can be implemented from the inputs shown in FIG. 4 so that in order for a login to occur at the visit site, the employee would have to present his/her credentials through his/her smart phone 304, 404 in order to be able to log at the desktop 302, 402, located at the visited site, to the remote server 308, 408. This systems 300, 400 allow the company to implement logic conditions of selectable degrees of complexity at remote sites by installing the appropriate networks of agents 310, 410. Consequently, the use of agent technology as disclosed herein, permits on-demand, just-in-time imposition of complex logic into the basic authentication system 100, 200 depicted in FIGS. 1 and 2.

Figure 5:
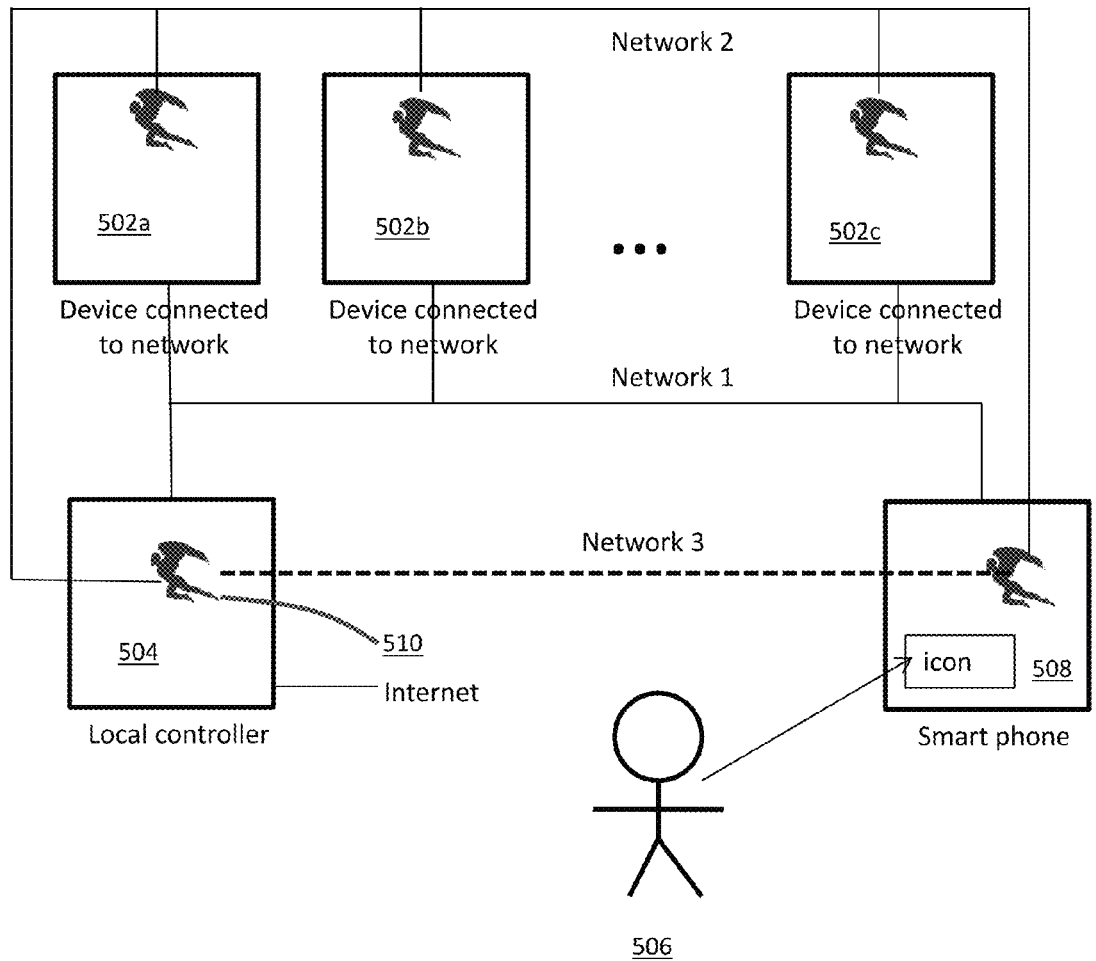
FIG. 5 depicts a block diagram of the system of FIG. 3 applied to a group of networked devices.
Figure 6:
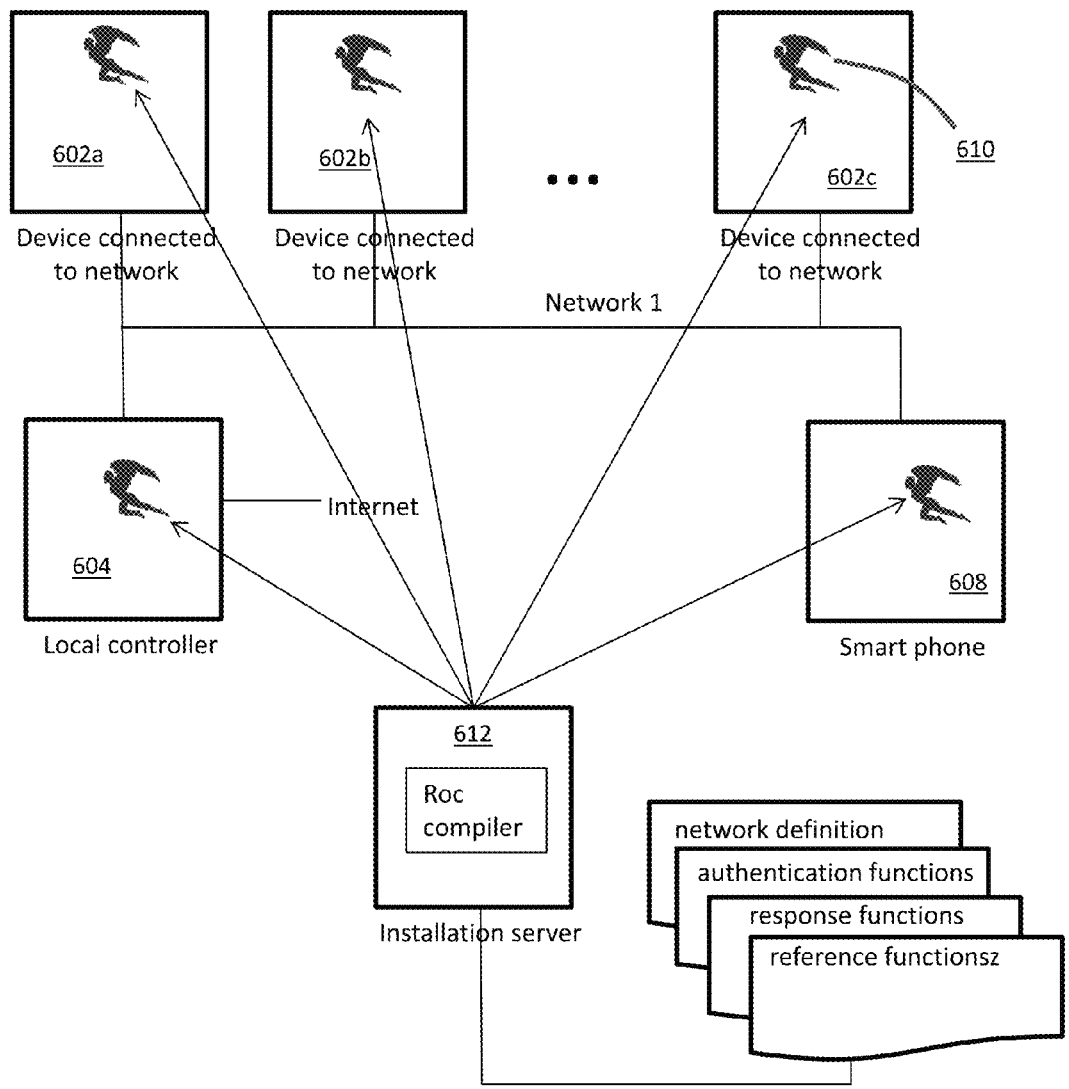
FIG. 6 depicts a block diagram of the system of FIG. 4 applied to a group of networked devices.

The systems 300, 400 can be extended to a system that establishes secure logins for a multitude of devices as shown in FIGS. 5 and 6. FIG. 5 depicts a system 500 with multiple devices 502a, 502b, 502c (generally 502) attached to a controller 504. The controller 504 then connects to a network, such as the Internet. The example system 500 represent a configuration that can include scores, hundreds, or even thousands of other devices 502, e.g., a so-called "Internet of Things." The devices 502 themselves can be networked using their own network, which may run a specialized protocol to manage multiple devices, such as CAN, or AllJoyn, MQTT, or TheSmartThings Hub. The network of agents 502 can communicate according to another network, for example, running on Ethernet or some other Internet protocol. Some of the agents 502 can be networked to a smart phone 508 on a network that uses a close proximity protocol such as BlueTooth or NFC.

FIG. 6, depicts a block diagram of the system of FIG. 4 applied to a group of networked devices. The system 600 depicts an installation of the agents 610 from an installation server 612. The agents 610 can be installed from one or more of a network definition file, predetermined authentication functions, response functions, and reference functions. Using a system 500, 600 such as shown in FIGS. 5 and 6, a company can install multiple devices 502, 602, e.g., in a remote location in accordance with detailed logic defined in the files used by the installation server 612 in shown in FIG. 6. The use of chains can be applied to provide complex logic is described herein. The use of agent technology also provides an ability to remotely audit the login functionality.

Figure 7:
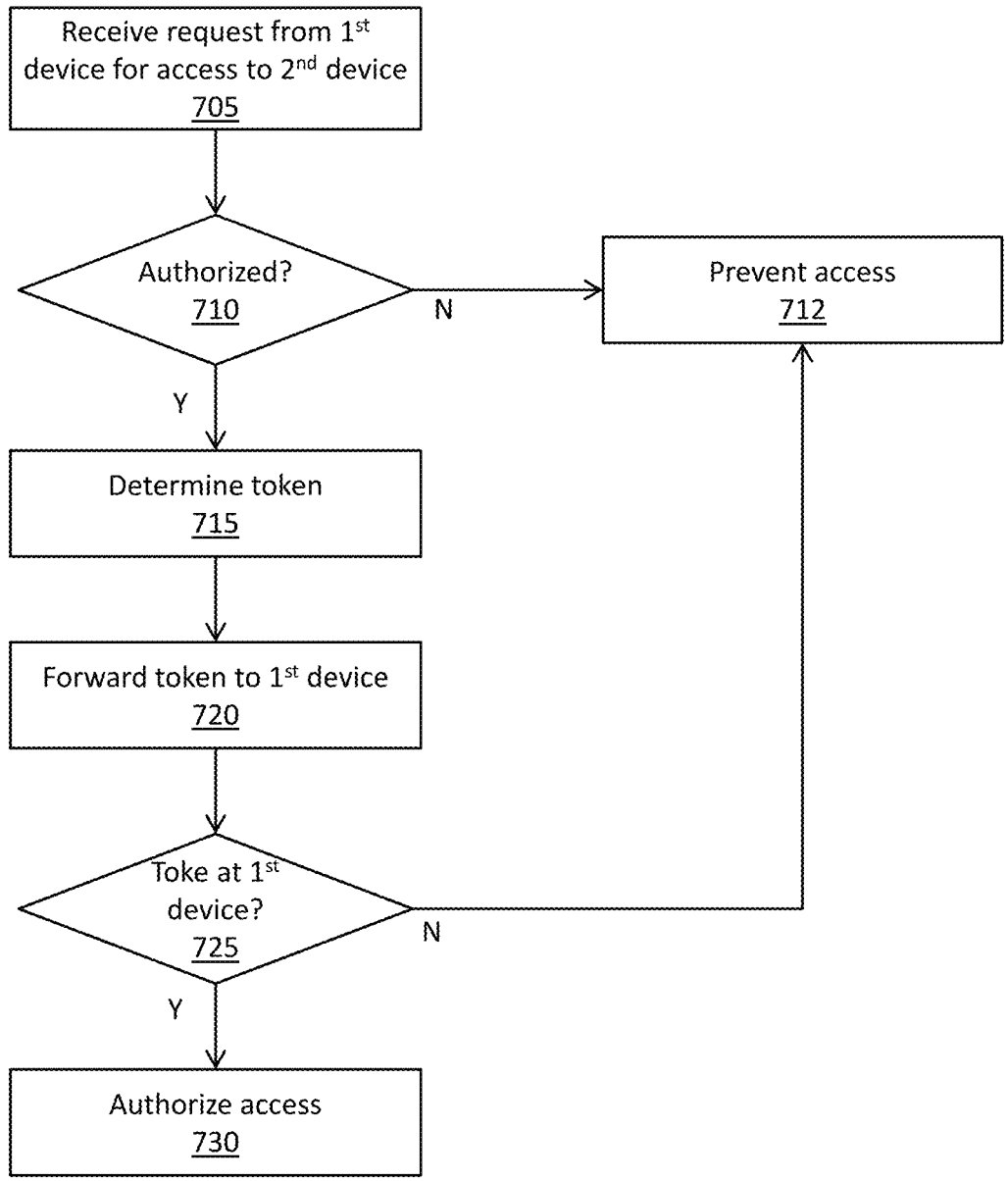
FIG. 7 depicts a process that provides access to restricted information.

FIG. 7 depicts a process 700 that can be used to provide access to restricted information. The process includes receiving a request from a first device, e.g., a smartphone 102, 202 for access to a second device, such as an application server or desktop computer 104, 204. Access to the second device can include access to the restricted information, e.g., an application program 112, 212. To the extent it is determined that access to the information is authorized at 710, a token is determined at 715. The token can include the actual credential information, and/or some other information related or otherwise associated with the credential information. By way of example, the token can include a shortened phrase 4 or 5 digits, such as, e.g., a random number representative of potentially munch more complex, e.g., 64 digit, credential. The token is forwarded to the first device at 720. To the extent it is determined that access to the information is not authorized at 710, access can be blocked or otherwise prevented at 712. In some embodiments, access can be blocked by not providing the necessary credential information.

A determination is made at 725 whether the token was received at the first device. The determination can be made, e.g., by presenting the token on a display and requesting that a user re-enter the token at a user entry device. Alternatively or in addition, a determination is made according to the first device being within a predetermined distance or proximity of another device, such as the desktop computer. To the extent that it is determined at 725 that the token was received at the first device, authorization is grated at 730 for access to the restricted information. To the extent that it is determined at 725 that the toke was not received at the first device, authorization is not granted or otherwise prevented at 712.

References to software agents, or agents, refers generally to a computer program or similar executable construct that acts for a user or other program, e.g., in a relationship of agency. In some embodiments, the agent communicates with a remote sever using encrypted packages for which encryption keys are periodically strobed. At least one such class of software agents is referred to as Anonymous Networked Global Electronic Link (ANGEL) agents. Anonymity can include situations in which a location of the server is generally known only to the ANGEL agent, or a collection of such agents. In general, software agents, such as ANGEL agents include restrictions. For example, the software (ANGEL) agent can be installed only once in a predefined location and can be run only once from a predefined target. Other agents, including other ANGEL agents can be located in a share directory, e.g., on a cluster of nodes, being executed from the share directory by one or more nodes in the cluster.

In some embodiments, a system for managing a file system includes accessing data stored in the file system, whereby the stored data has been encrypted by a cryptographic key. A decryption key suitable for decrypting such information can be generated by a network of software agents. When the file system is accessed, a request is made to the network of agents to generate the key. The network of software agents runs a chain of such agents so that each software agent in the chain produces a respective portion of cryptographic material, which is passed to the next agent. The agents in the chain are configured to conduct respective examinations of an environment, such as an environment of the requesting server. The software agents produce cryptographic material, which depends on results obtained from the examination. A last software agent in the chain of software agents produces a key, which is a combination of the material added by preceding agents in the chain. The key, when generated correctly, allows access to the encrypted data stored in the file system. Whether the correct key is generated depends upon each of the examinations returning a result that is equivalent to an expected result, or within a range of such expected results. To the extent any of the examinations return a result that is not equivalent to or within such a range, the key will not be operative to decrypt the encrypted stored information.

At least some of the techniques disclosed herein include the use of agent technology. Such agent technology can be used, e.g., to examine a controllable platform or process and a remote controller before installation of protection software and application software. In at least some embodiments, such agent technology can be used to provide continued examination of one or more of the machines 202, 212 (FIG. 2), while one or more applications on one or more other machines, e.g., one or more of the machines 202, 212, are executing.

In some embodiments, the software agents operate entirely at the software level. In other cases, the software agents interact with hardware, such as physical sensors. Examples of sensors include, without limitation, one or more of environmental sensors, biological sensors, and more generally physical sensors and/or software sensors or monitors used to monitor application. The software or sensors that can detection values from the mission scenario, software and sensors that can detect unique characteristics of the hardware environment to prevent software from being executed in a falsified virtual environment, Environmental sensors include, without limitation, temperature sensors, humidity sensors, light sensors, position sensors, orientation sensors, altitude sensors, and motion sensors including one or more of speed or acceleration. Biological sensors include, without limitation, blood pressure sensors, blood oximeter sensors, electrical conductivity sensors, pulse rate sensors, image sensors, retinal scan sensors, finger print sensors, and the like. The system of installed software agents also is able to detect attacks and unauthorized activity. The software agents can be configured to check on one another. For example, one agent can determine if another agent is slow in responding or otherwise not available. Such indications might indicate unauthorized activity such as the presence of a debugger or an attempt to execute the software in an unauthorized environment or an attempt to execute individual software agents when the entire network of software agents is not running.

In at least some embodiments, intelligent software agents can be configured to perform collaborative tasks, e.g., by functioning in, so-called, "chains." In a chain, multiple intelligent software agents work together to perform a specific task. Examples of such chains are disclosed, e.g., in commonly owned U.S. Pat. No. 7,841,009, entitled "System and Method for Defending Against Reverse Engineering of Software, Firmware and Hardware," the entire contents of which are incorporated herein by reference in its entirety. In the present disclosure, the chains of intelligent software agents can be configured to include one or more functions. The functions can be prepared by a system design team and imposed or otherwise implemented, e.g., according to a predefined policy. For example, one or more of the functions can be configured to expect one or more values. Such values can be expressed as a particular value, e.g., a number, or as a range of values. In operation, if a function returns a value that is out of range, the chain can continue to execute without indicating to an observer that such an out of range result was obtained. In one embodiment, a function testing for a scenario, environmental or system value that falls within a range, produces cryptographic values with high entropy using a hash or other such technology. For example, a chain configured to produce cryptographic material, such as an encryption and/or decryption key, still produces a key, although the key will not decrypt its target object. Such an approach complicates attempts at reverse engineering and/or unauthorized attempts to access features of the system, such as sensitive information.

Sensitive technologies, sometimes referred to as sensitive or critical technologies, e.g., depending upon a particular mission or application, can be made very difficult to obtain by encryption with appropriate algorithms and keys. Policy can be embedded in one or more elements of the control system to examine one or more of the mission application and local environments, while the applications executes. A so-called "safe" environment can be identified by policy, such that sensitive information related to a mission or application can be conditioned upon a belief or conclusion of the environment is safe. Thus, if the examination reveals that the application is operating in a safe environment, the sensitive technology can be decrypted and executed; otherwise, the critical technology is not decrypted. If a system safety state changes from safe to unsafe as defined by the embedded policy, any unencrypted, e.g., "clear text" instances of the sensitive technology are deleted and/or otherwise destroyed. In at least some embodiments, a penalty can be imposed, e.g., in response to a determination that the system state is unsafe, so that the sensitive technology can never be decrypted. In some embodiments, this penalty can be covertly imposed, so that an adversary attempting to reverse engineer the system does not immediately realize that the task of obtaining a correct key has been rendered impossible.

While information is traversing the software agents of a chain, the software agents in the chain can be configured to run various functions to examine the system. Examination of the system can include examination of sensory input, process status, and status of one or more of the software agents themselves. In at least some embodiments, chains of software agents are used to generate encryption and/or decryption key material, e.g., resulting from examinations conducted by software agents of the chain. For example, respective fragments of key material determined by each software agent of the chain can be combined to produce a key. If the examinations performed by the software agents fall within a predetermined or otherwise established range, the resulting key can be used decrypt its target object; otherwise, despite the key being generated, the resulting key will not decrypt the target object. The target object can be sensitive technology embedded within an installed artifact or it can be a target object designed to test whether the system is in certain state.

It is understood that multiple chains can be created to perform different cryptographic or examination functions in a cooperative manner in order to obtain a key. Such cooperative approaches can include logical combinations of one or more individual chains, such that a desired result, e.g., generation of a successful key, is obtained only when each of the chains produces a respective result that when combined according to the logic results in the desired result.

Thus, functions can be written by system designer following appropriate format rules or written by programmers to achieve certain objectives. The ranges of successful performance of the functions are specified by the system designers. The functions, the chains, the software agents which composed the chains, and the functions a specific agent executes within a specific chain can all defined or identified, e.g., by a network definition file.

The design of a software agent network can be different for each system and can also depend on one or more of the functionality of the target system or the decisions of the system designer with respect to sensitive technology protection and the functions that the network of software agents is to perform. Using the techniques disclosed herein, it is possible to design a network of software agents that will make the sensitive technology available in an unencrypted fashion only if the system is in a predefined state as pre-chosen by the system designer during a design phase, e.g., generally conducted in a secure environment.

A procedure for installation of an angel network can be divided into several phases. In the first phase, the network of software agents can be used to gather information about a target system, e.g., the file system 104 (FIG. 1), the server 102 and/or the software agent module 106. In a second phase, a version of the network of software agents is run on the target hardware, e.g., the software agent module 106, to produce key material assuming the system is running in a safe state. The key thus produced is used to encrypt and/or decrypt the sensitive technology, such as the file system 104. In a third phase, the encrypted sensitive technology is embedded in a third version of the network of software agents. The third version of the network of software agents is used to protect the controlled process and the controller when they execute the application on the controlled process. Other versions of the network of software agents are destroyed.

Multiple instances of sensitive technology can be protected in this fashion using multiple chains which will produce different keys for each instance. It is also possible to produce functions or code fragments which can be passed from agent to agent so that the function or fragment is sent from one agent and executes on another agent. This technique can be used to examine a target execution environment by running software on the target that has never before appeared on the target.

A network of software agents can conduct examinations of a system state and optionally, at the request of the system designer, can impose a penalty so that the critical technology can never be decrypted. If the change in system state is discovered before an adversary has been able to copy the entire system to a virtualized environment, the penalty can be imposed on cryptographic material that is stored in a non-volatile medium on the system hardware. If the adversary has successfully copied the system to another medium, the penalty can be imposed within the copied artifacts. The penalty should be imposed covertly so that the adversary will not realize that the penalty has been imposed and will continue to experiment with the abstracted system rather than refreshing it. The strategy of always producing a key, even if the key does not correctly decrypt, hides from the adversary whether a penalty has already been imposed and hopefully will require the adversary to engage in months or years of fruitless reverse engineering effort.

The network definition file can be utilized to define blocks of data, such as randomly generated data that are installed into artifacts that make up the network of angels that will run on the target system. These blocks of data can be used to provide session keys that are used for initial communications among the angels and also to produce longer keys that can be used to encrypt communications among the angels. Any of the keys produced according to the techniques disclosed herein could be used to perturb blocks of installed random data so as to produce longer keys to encrypt and decrypt the critical technology.

Figure 8:
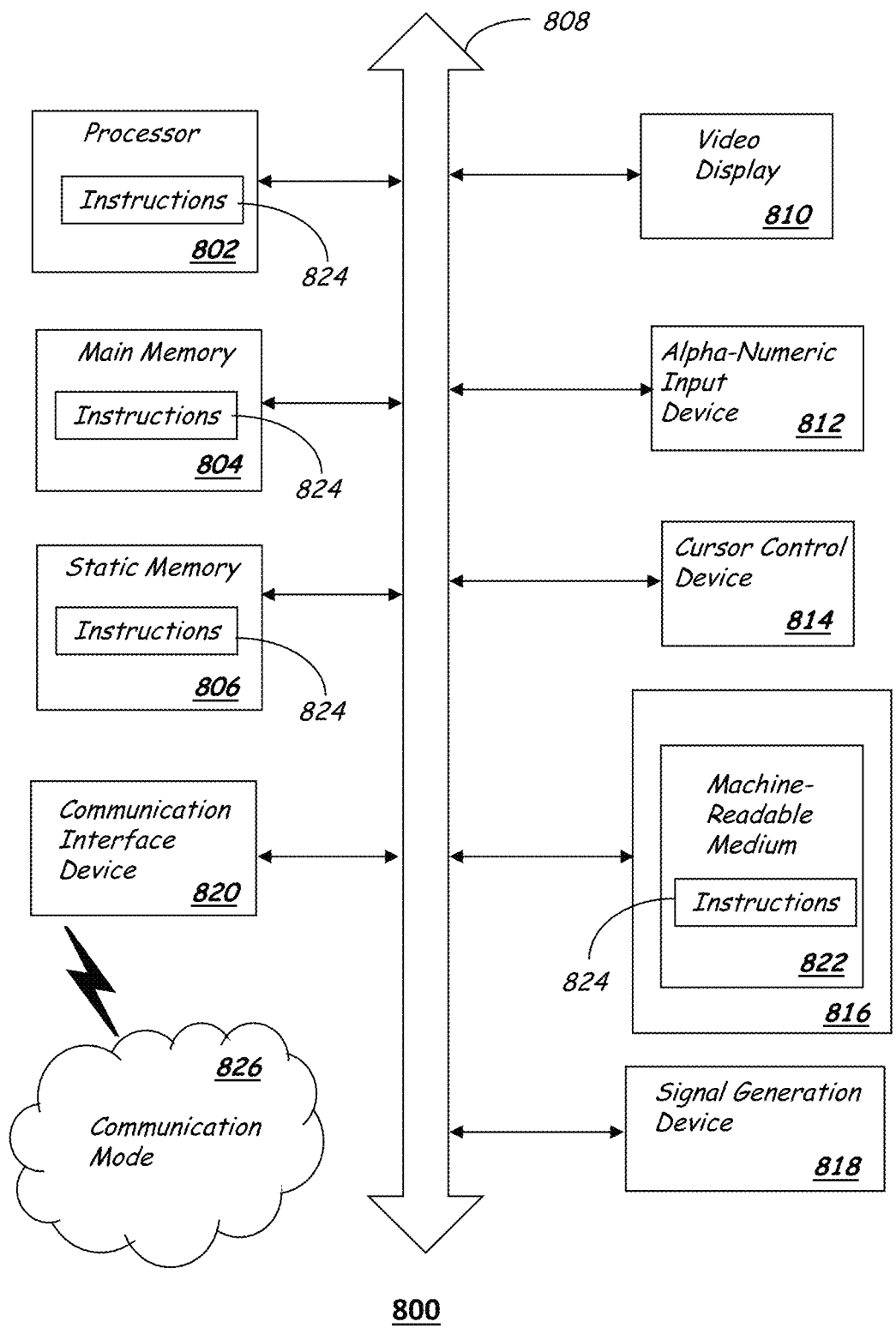
FIG. 8 is a diagrammatic representation of a machine in the form of a computer system within which a set of instructions, when executed, may cause the machine to perform any one or more of the processes described herein.

FIG. 8 depicts an exemplary diagrammatic representation of a machine in the form of a computer system 800 within which a set of instructions, when executed, may cause the machine to perform any one or more of the processes and techniques describe above. One or more instances of the mobile devices 102, 202, 304, 404, 508, the local controllers 104, 204, 302, 402, 504, devices connected to the network 402, 502, 602, the remote servers 108, 208, 308 and or the installation server 420, 612. In some embodiments, the machine 800 can be connected (e.g., using a communication mode, such as a public or private network, e.g., network to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 800 may include a processor (or controller) 802 (e.g., a central processing unit (CPU), a graphics processing unit (GPU, or both), a main memory 504 and a static memory 806, which communicate with each other via a bus 808. The computer system 800 may further include a display unit 810 (e.g., a liquid crystal display (LCD), a flat panel, or a solid state display. The computer system 800 may include an input device 812 (e.g., a keyboard), a cursor control device 814 (e.g., a mouse), a disk drive unit 816, a signal generation device 818 (e.g., a speaker or remote control) and a network interface device 820. In distributed environments, the embodiments described in the subject disclosure can be adapted to utilize multiple display units 810 controlled by two or more computer systems 800. In this configuration, presentations described by the subject disclosure may in part be shown in a first of the display units 810, while the remaining portion is presented in a second of the display units 810.

The disk drive unit 816 may include a tangible computer-readable storage medium 822 on which is stored one or more sets of instructions (e.g., software 824) embodying any one or more of the methods or functions described herein, including those methods illustrated above. The instructions 824 may also reside, completely or at least partially, within the main memory 804, the static memory 806, and/or within the processor 802 during execution thereof by the computer system 800. The main memory 804 and the processor 802 also may constitute tangible computer-readable storage media.

Dedicated hardware implementations including, but not limited to, application specific integrated circuits, programmable logic arrays and other hardware devices that can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the methods described herein are intended for operation as software programs running on a computer processor or other forms of instructions manifested as a state machine implemented with logic components in an application specific integrated circuit or field programmable array. Furthermore, software implementations can include, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations on a controllable device may perform such operations on the controllable device directly or indirectly by way of an intermediate device directed by the computing device.

While the tangible computer-readable storage medium 822 is shown in an example embodiment to be a single medium, the term "tangible computer-readable storage medium" should be taken to include a single medium, or multiple media (e.g., a centralized or distributed database, and/or associated caches and servers) that store the one or more sets of instructions. The term "tangible computer-readable storage medium" shall also be taken to include any non-transitory medium including a device that is capable of storing or encoding a set of instructions for execution by the machine and that cause the machine to perform any one or more of the methods of the subject disclosure.

The term "tangible computer-readable storage medium" shall accordingly be taken to include, but not be limited to devices, such as: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth, WiFi, Zigbee), and long-range communications (e.g., WiMAX, GSM, CDMA, LTE) can be used by computer system 800.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed:

1. A method comprising:

receiving, by a server comprising a processor, a request from a mobile communication device of a user to allow user access to an application program of a separate device, wherein the request is received by way of a first network;

forwarding, by the server, a token to the separate device by way of a second network, to obtain a separate device token, and forwarding, by the server, the token to the mobile communication device by way of the first network to obtain a mobile communication device token, wherein the mobile communication device forwards the mobile communication device token to the separate device by way of a third network;

determining, by the server, a result of a comparison between the separate device token and the mobile communication device token;

confirming, by the server, that the mobile communication device token was received at the separate device, based on the result of the comparison indicating a match between the mobile communication device token and the separate device token; and authorizing, by the server, access to the application program of the separate device in response to the confirming that the mobile communication device token was received at the separate device.

2. The method of claim 1, wherein the first network comprises a cellular mobile network and wherein the third network comprises a proximity network comprising one of a near field communications protocol, a mobile personal area network protocol, a Bluetooth personal area network protocol, or a wireless local area network protocol.

3. The method of claim 1, further comprising determining, by the server, a valid encryption key in response to the confirming that the mobile communication device token was received at the separate device, wherein the authorizing of the access to the application program is in response to the determining of the valid encryption key and the confirming that the mobile communication device token was received at the separate device, wherein the valid encryption key is unknown by the mobile communication device and the separate device, and wherein the valid encryption key is unknown by the server before the receiving of the request from the mobile communications device, and wherein the separate devices comprises a vehicle remotely pilotable by way of the mobile communication device.

4. The method of claim 3, further comprising forwarding the valid encryption key to the separate device, wherein the valid encryption key is used to encrypt one of data related to the application program or communications between the separate device and one of the mobile communication device, the server or both, and wherein the vehicle comprises a ground vehicle.

5. The method of claim 3, wherein the determining of the valid encryption key is based on an execution of a plurality of agent modules on a plurality of processors to obtain a plurality of cryptographic materials that when combined determine the valid encryption key.

6. The method of claim 5, wherein the executing of the plurality of agent modules comprises determining that one or more of the mobile communication device, the separate device and the server is in a safe state, wherein the plurality of cryptographic materials that when combined determine the valid encryption key responsive to the determining that the one or more of the mobile communication device, the separate device and the server is in the safe state.

7. The method of claim 6, wherein the determining that the one or more of the mobile communication device, the separate device and the server is in a safe state based on a predetermined state of the one or more of the mobile communication device, the separate device and the server.

8. The method of claim 6, further comprising accessing, by the server, a configuration file that specifies the plurality of agent modules and a plurality of conditions identifying the safe state.

9. The method of claim 8, further comprising:
encrypting, by the server, the token based on the valid encryption key; and
transferring, by the server, the valid encryption key to one or more of the mobile communication device, the separate device or the server,
wherein a successful decryption of the token on the one or more of the mobile communication device, the separate device or the server based on the valid encryption key indicates that a system of one or more of the mobile communication device, the separate device and the server is in a safe state according to a predetermined safe state of a network definition file.

10. The method of claim 6, further comprising:
identifying, by the server, the plurality of agent modules;
installing, by the server, the plurality of agent modules on one or more of the mobile communication device, the separate device or the server; and
executing, by the server, the plurality of agent modules on the one or more of the mobile communication device, a separate device or the server.

11. The method of claim 10, wherein the identifying of the plurality of agent modules, the installing of the plurality of agent modules, and the executing of the plurality of agent modules are responsive to the receiving of the request.

12. A system comprising:
a server comprising a processing system including a processor; and
a memory that stores executable instructions that when executed by the processing system, facilitate performance of operations comprising:
receiving, by way of a first network, a request from a mobile communication device of a user to provide user access to an application program of a another device;
forwarding a token to the another device by way of a second network, to obtain another device token, and forwarding the token to the mobile communication device by way of the first network to obtain a mobile communication device token, wherein the mobile communication device forwards the mobile communication device token to the another device by way of a third network;
determining, by the server, a result of a comparison between the another device token and the mobile communication device token;
confirming that the token was received at the mobile communication device, based on the result of the comparison indicating a match between the mobile communication device token and the another device token; and
authorizing access to the application program of the another device in response to the confirming that the mobile communication device token was received at the another device.

13. The system of claim 12, wherein the first network comprises a cellular mobile network
wherein the another devices comprises an unpiloted drone, and
wherein the third network comprises a proximity network comprising one of a near field communications protocol, a mobile personal area network protocol or a wireless local area network protocol.

14. The system of claim 13, wherein the unpiloted drone is remotely operated by way of a remote control, the operations further comprising:
identifying a valid encryption key determined in response to the confirming that the mobile communication device token was received at the another device,
wherein the authorizing of the access to the application program is in response to the determining of the valid encryption key and the confirming that the mobile communication device token was received at the another device, and
wherein the valid encryption key is unknown by the mobile communication device and the another device, and wherein the valid encryption key is unknown by the server before the receiving of the request from the mobile communications device.

15. The system of claim 14, wherein the identifying of the valid encryption key comprises determining the valid encryption key based on an execution of a plurality of agent modules on a plurality of processors to obtain a plurality of cryptographic materials that when combined determine the valid encryption key.

16. The system of claim 15, wherein the executing of the plurality of agent modules comprises determining that one or more of the mobile communication device, the another device and the server is in a safe state, and
wherein the plurality of cryptographic materials that when combined determine the valid encryption key responsive to the determining that the one or more of the mobile communication device, the another device and the server is in the safe state.

17. The system of claim 16, wherein the determining that the one or more of the mobile communication device, the another device and the server is in a safe state based on a predetermined state of the one or more of the mobile communication device, the another device and the server, and wherein the another device comprises a ground vehicle.

18. A non-transitory machine-readable storage medium, comprising executable instructions that, when executed by a processor, facilitate performance of operations, comprising:
receiving a request from a first device of a user, by way of a first wireless network, to access information content of a second device;
forwarding a token to the second device by way of a second wireless network, to obtain a second device token, and forwarding the token to the first device by way of the first wireless network to obtain a first device token, wherein the first device forwards the first device token to the second device by way of a third network;

determining a result of a comparison between the second device token and the first device token;

confirming that the token was received at the first device based on the result of the comparison indicating a match between the first device token and the second device token; and authorizing access to the information content of the second device in response to confirming that the token was received at the first device, wherein the second device comprises a remotely pilotable vehicle.

19. The non-transitory machine-readable storage medium of claim 18, further comprising identifying a valid encryption key determined in response to the confirming that the first device token was received at the second device, wherein the authorizing of the access to the information content is in response to the determining of the valid encryption key and the confirming that the first device token was received at the second device, and wherein the valid encryption key is unknown by the first device and the second device.

20. The non-transitory machine-readable storage medium of claim 19, wherein the identifying of the valid encryption key comprises determining the valid encryption key based on an execution of a plurality of agent modules on a plurality of processors to obtain a plurality of cryptographic materials that when combined determine the valid encryption key.

* * * * *